United States Patent
Reynolds, Jr. et al.

(10) Patent No.: US 7,575,255 B2
(45) Date of Patent: Aug. 18, 2009

(54) WEDGE THREAD WITH HIGH-ANGLE METAL SEAL

(75) Inventors: Harris A. Reynolds, Jr., Houston, TX (US); David Llewellyn Mallis, The Woodlands, TX (US)

(73) Assignee: Hydril LLC, Houston, TX (US)

( * ) Notice: Subject to any disclaimer, the term of this patent is extended or adjusted under 35 U.S.C. 154(b) by 0 days.

(21) Appl. No.: 11/424,783

(22) Filed: Jun. 16, 2006

(65) Prior Publication Data

US 2006/0220382 A1    Oct. 5, 2006

Related U.S. Application Data

(63) Continuation-in-part of application No. 11/026,512, filed on Dec. 30, 2004, now Pat. No. 7,243,957.

(51) Int. Cl.
   *F16L 25/00* (2006.01)
(52) U.S. Cl. .................................. 285/333; 285/334
(58) Field of Classification Search ......... 285/333–334, 285/355, 390
   See application file for complete search history.

(56) References Cited

U.S. PATENT DOCUMENTS

| | | | |
|---|---|---|---|
| 2,239,942 A | | 4/1941 | Stone et al. |
| 2,992,019 A | | 7/1961 | MacArthur |
| 3,359,013 A | | 12/1967 | Knox et al. |
| 3,994,516 A | * | 11/1976 | Fredd ......................... 285/39 |
| 4,161,332 A | * | 7/1979 | Blose ........................ 285/334 |
| RE30,647 E | | 6/1981 | Blose |
| 4,570,982 A | * | 2/1986 | Blose et al. ................. 285/334 |
| 4,582,348 A | | 4/1986 | Dearden |
| 4,662,659 A | | 5/1987 | Blose |
| 4,688,832 A | | 8/1987 | Ortloff |
| 4,703,954 A | | 11/1987 | Ortloff |
| 4,730,857 A | * | 3/1988 | Schwind .................... 285/390 |
| 4,753,460 A | * | 6/1988 | Tung .......................... 285/331 |
| RE34,467 E | | 12/1993 | Reeves |

(Continued)

FOREIGN PATENT DOCUMENTS

EP    1 302 623    4/2003

(Continued)

OTHER PUBLICATIONS

U.S. Office Action dated Jan. 9, 2008 issued in related U.S. Appl. No. 11/027,014, 8 pages.

(Continued)

*Primary Examiner*—Aaron M Dunwoody
*Assistant Examiner*—Fannie Kee
(74) *Attorney, Agent, or Firm*—Osha • Liang LLP (57) ABSTRACT

A threaded connection includes a pin member providing a single external thread comprising a first external portion and a second external portion, a box member providing a single internal thread comprising a first internal portion and a second internal portion, and a radial metal-to-metal seal to seal between the pin member and the box member, wherein the first and second internal portions threadably correspond with the first and second external portions, and wherein the first internal and external portions are characterized by a first wedge ratio and the second internal and external portions are characterized by a second wedge ratio, wherein the first wedge ratio is less than the second wedge ratio.

19 Claims, 8 Drawing Sheets

U.S. PATENT DOCUMENTS

| | | | |
|---|---|---|---|
| 5,360,239 | A | 11/1994 | Klementich |
| 5,454,605 | A | 10/1995 | Mott |
| 5,462,315 | A | 10/1995 | Klementich |
| 6,050,610 | A | 4/2000 | Enderle |
| 6,174,001 | B1 | 1/2001 | Enderle |
| 6,206,436 | B1 | 3/2001 | Mallis |
| 6,270,127 | B1 | 8/2001 | Enderle |
| 6,578,880 | B2 | 6/2003 | Watts |
| 6,682,101 | B2 | 1/2004 | Watts |
| 6,722,706 | B2 | 4/2004 | Church |
| 6,976,711 | B2 | 12/2005 | Sivley, IV |
| 7,243,957 | B2 | 7/2007 | Reynolds, Jr. |
| 2002/0027363 | A1* | 3/2002 | Mallis et al. ................ 285/334 |

FOREIGN PATENT DOCUMENTS

| | | |
|---|---|---|
| FR | 1 300 262 A | 8/1962 |
| JP | 2004-524483 | 8/2004 |
| WO | WO-2004/106797 | 12/2004 |

OTHER PUBLICATIONS

Office Action dated May 15, 2008 for corresponding U.S. Appl. No. 11/775,682 (9 pages).

\* cited by examiner

Axial Position

Axial Position

WEDGE THREAD WITH HIGH-ANGLE METAL SEAL

CROSS-REFERENCE TO RELATED APPLICATIONS

The present application is a Continuation-In-Part of U.S. patent application Ser. No. 11/026,512, filed on Dec. 30, 2004, hereby incorporated by reference in its entirety herein.

BACKGROUND OF INVENTION

1. Field of the Invention

The present invention generally relates to wedge-threaded components of tubular connections. More particularly, the present invention relates to wedge-threaded components of tubular connections incorporating a metal-to-metal seal therebetween. More particularly still, the present invention relates to single-step multi-portion wedge-threaded tubular connections incorporating high-angle metal-to-metal seals.

2. Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seal), thread seals, metal-to-metal seals, or any other seals known to one of ordinary skill in the art.

It should be understood that certain terms are used herein as they would be conventionally understood, particularly where threaded tubular joints are connected in a vertical position along their central axes such as when making up a pipe string for lowering into a well bore. Typically, in a male-female threaded tubular connection, the male component of the connection is referred to as a "pin" member and the female component is called a "box" member. As used herein, "make-up" refers to engaging a pin member into a box member and threading the members together through torque and rotation. Further, the term "selected make-up" refers to the threading of a pin member and a box member together with a desired amount of torque or based on a relative position (axial or circumferential) of the pin member with respect to the box member. Furthermore, the term "box face" is understood to be the end of the box member facing outward from the box threads and the term "pin nose" is understood to be the end of the pin member facing outward from the threads of the connection. As such, upon make-up of a connection, the nose of the pin is stabbed or inserted into and past the face of the box.

Referring to the geometry of threads, the term "load flank" designates the side wall surface of a thread that faces away from the outer end of the respective pin or box member on which the thread is formed and supports the weight (i.e., tensile load) of the lower tubular member hanging in the well bore. Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e., compressive force).

Figures 1A, 1B:
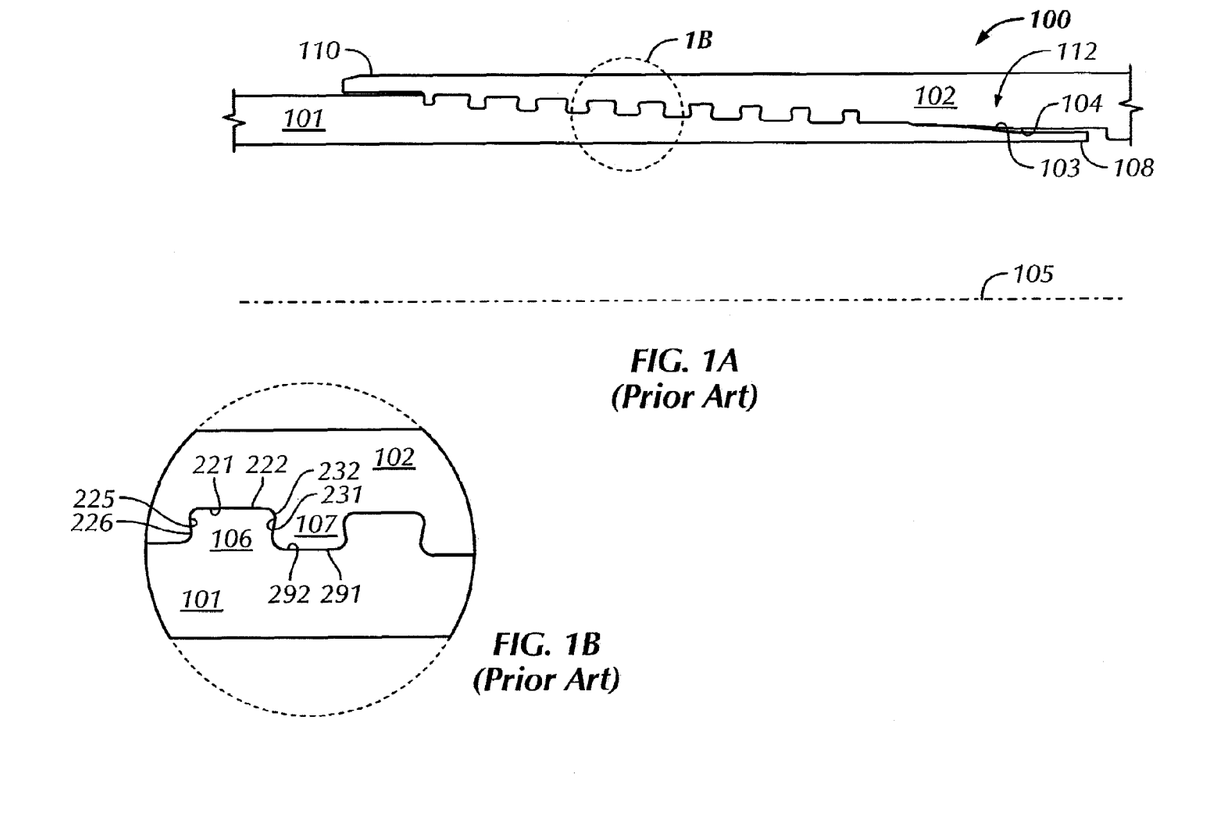
FIGS. 1A and 1B depict cross-sectional views of a prior art tubular connection having wedge threads.

One type of threaded connection commonly used in oil country tubular goods is a wedge thread. Referring initially to FIGS. 1A and 1B, a prior art tubular connection 100 having a wedge thread is shown. As used herein, "wedge threads" are threads, regardless of a particular thread form, that increase in width (i.e., axial distance between load flanks 225 and 226 and stab flanks 232 and 231) in opposite directions on a pin member 101 and a box member 102. The rate at which the threads change in width along the connection is defined by a variable known as the "wedge ratio." As used herein, "wedge ratio," although technically not a ratio, refers to the difference between the stab flank lead and the load flank lead, which causes the width of the threads to vary along the connection. Furthermore, as used herein, a thread "lead" refers to the differential distance between a component of a thread on consecutive threads. As such, the "stab lead" is the distance between stab flanks of consecutive thread pitches along the axial length of the connection. A detailed discussion of wedge ratios is provided in U.S. Pat. No. 6,206,436, issued to Mallis, assigned to the assignee of the present invention, and incorporated by reference in its entirety herein. Furthermore, wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference in their entirety.

Referring still to FIGS. 1A and 1B, a pin thread crest 222 in a wedge thread coupling is narrow towards a distal end 108 of pin member 101 while a box thread crest 291 is wide. Moving along an axis 105 (from right to left), pin thread crest 222 widens while box thread crest 291 narrows as it approaches a distal end 110 of box member 102. As shown in FIG. 1A, the threads are tapered, meaning that a pin thread 106 increases in diameter from beginning to end while a box thread 107 decreases in diameter in a complimentary manner. Having a thread taper may improve the ability to stab pin member 101 into box member 102 and distribute stress throughout the connection.

Generally, thread seals are difficult to achieve in non-wedge (i.e., free-running) threads. However, thread forms that are unable to form a wedge seal in a free-running configuration may create thread seals when used in a wedge thread configuration. As should be understood by one of ordinary skill, as wedge threads do not require any particular type or geometry of thread form, a variety of thread forms may be used. One example of a suitable thread form is a semi-dovetailed thread form disclosed in U.S. Pat. No. 5,360,239, issued to Klementich and incorporated herein by reference in its entirety. Another thread form includes a multi-faceted load flank or stab flank, as disclosed in U.S. Pat. No. 6,722,706, issued to Church and incorporated herein by reference in its entirety. Each of the above thread forms is considered to be a "trapped" thread form, meaning that at least a portion of the corresponding load flanks and/or corresponding stab flanks axially overlap. An open (i.e., not trapped) thread form with a generally rectangular shape is disclosed in U.S. Pat. No. 6,578,880, issued to Watts and incorporated herein by reference in its entirety. As such, the above thread forms (i.e., those of Klementich, Church, and Watts) are examples of thread forms that may be used with embodiments of the invention. Generally, open thread forms such as buttress or stub are not suitable for wedge threads, as they would impart a large radial force on the box member. However, a generally square thread form, such as that disclosed by Watts, or a trapped thread form, may be used, as they do not impart an outward radial force on the box member. As such, those having ordinary skill in the art will appreciate that the teachings contained herein are not limited to particular thread forms.

Referring again to FIGS. 1A and 1B, in wedge threads, a thread seal may be accomplished through contact pressure caused by interference that occurs at make-up over at least a portion of connection 100 between pin load flank 226 and box load flank 225 and between pin stab flank 232 and box stab flank 231. Close proximity or interference between roots 292 and 221 and crests 222 and 291 complete the thread seal when occurring proximate to such flank interference. Generally, higher pressures may be contained either by increasing interference between the roots and crests ("root/crest interference") on pin member 101 and box member 102 or by increasing the aforementioned flank interference.

Although various wedge thread connections exist having positive-stop torque shoulders (e.g., Klementich, referenced above), wedge threads typically do not have torque shoulders, so their make-up is "indeterminate," and, as a result, the relative position of the pin member and box member may vary more during make-up for a given torque range to be applied than for connections having a positive-stop torque shoulder. For wedge threads designed to have flank interference and root/crest interference at a selected make-up, the connection is designed such that both the flank interference and root/crest interference increase as the connection is made-up (i.e. an increase in torque increases flank interference and root/crest interference). For tapered wedge threads having root/crest clearance, the clearance decreases as the connection is made-up. Regardless of the design of the wedge thread, corresponding flanks come closer to each other (i.e., clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection. However, increased interference and make-up torque may increase stress on the connection during make-up, which may lead to premature failure of the connection.

Furthermore, as shown, connection 100 includes a metal-to-metal seal 112 created by contact between corresponding seal surfaces 103 and 104, respectively located on pin member 101 and box member 102. Metal-to-metal seal 112 provides an additional measure of seal integrity (i.e., when a wedge thread seal is not sufficient) for threaded connection 100, and is particularly useful where connection 100 is intended to contain high-pressure gases. While the metal-to-metal seal is shown located proximate to the distal end 108 of pin member 102, it should be understood by one of ordinary skill in the art that metal-to-metal seal 112 may be positioned anywhere along the length of connection 100, including, but not limited to, a location proximate to the distal end of box member 102.

Nonetheless, seal surfaces 103 and 104 of metal-to-metal seal 112 are usually constructed as corresponding frusta-conical surfaces characterized by a low angle (e.g., an angle less than about 4 or 5 degrees) of intersection with their corresponding remaining pin 101 and box 102 surfaces. Typically, low-angle metal-to-metal seal surfaces 103 and 104 are used in conjunction with wedge thread connections (e.g., 100) because the indeterminate make-up thereof necessitates a seal capable of less precise axial alignment. As wedge threads make-up indeterminately, the relative axial position of pin member 101 and box member 102 will vary over successive make-up and breakout cycles. However, one disadvantage of a low-angle metal-to-metal seal is that seal surfaces 103 and 104 have larger friction contact areas than higher-angle seals, and as such, have less resistance to galling upon make-up. Furthermore, as low-angle metal-to-metal seals engage slowly (i.e., low radial displacement per revolution), the seals must be in contact for several revolutions. As such, in a wedge thread connection including a metal-to-metal seal, the seal is typically the first thing to "make-up," such that the initial engagement of the seal marks the "hand tight" state of such a threaded connection. Therefore, while low-angle seals are beneficial in that they accommodate the indeterminate make-up characteristics of wedge threads, they may become ineffective over repeated make-up and break-out cycles as seal surfaces 103 and 104 are deformed and/or are cold-worked out of specification.

Figure 2:
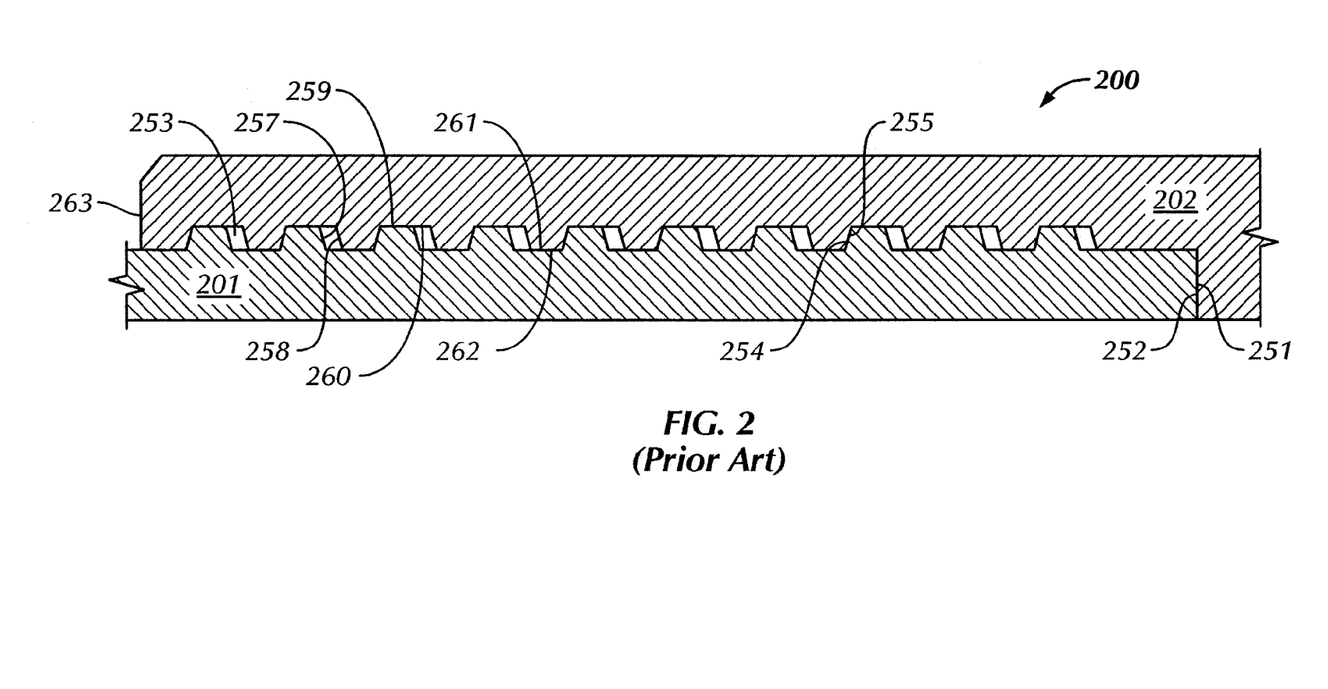
FIG. 2 is a cross-sectional view of a prior art tubular connection having free-running threads.

In contrast, free-running threads used in oilfield tubular connections typically do not form thread seals when the connection is made-up. Referring now to FIG. 2, a prior art connection 200 having free-running threads is shown. The free-running threads include load flanks 254 and 255, stab flanks 257 and 258, crests 259 and 262, and roots 260 and 261. As is typical of a connection with free-running threads, connection 200 relies on a positive-stop torque shoulder formed by the contact of surfaces 252 and 251 disposed on a pin member 201 and a box member 202, respectively. The positive-stop torque shoulder shown in FIG. 2 is commonly referred to as a "pin nose shoulder." In other connections, the positive-stop torque shoulder may instead be formed by a box face 263 and a mating shoulder (not shown) on pin member 201. The positive-stop torque shoulder also provides a seal. Unlike wedge threads (e.g., those shown in FIG. 1B), which make-up by the wedging of the pin thread 106 and the box thread 107, free-running threads rely on the positive-stop torque shoulder to load connection 200 during make-up. To make-up connection 200, pin member 201 and box member 202 are screwed together until surfaces 251 and 252 are brought into abutment, at which point pin load flank 254 and box load flank 255 are also in abutment. Additional torque is applied to pin member 201 and box member 202 to load surfaces 252 and 251 and pin load flank 254 and box load flank 255 until the desired amount of make-up torque (i.e., the selected make-up) has been applied to connection 200.

Because a large gap 253 exists between pin stab flank 257 and box stab flank 258, connection 200 does not accomplish a thread seal. Gap 253 occurs as a result of how free-running threads with positive-stop torque shoulders are loaded. Applying torque to connection 200 during make-up against the positive-stop torque shoulder causes pin member 201 to be compressed while box member 202 is stretched in tension. Note that when a box face shoulder is used, box member 202 is compressed while pin member 201 is stretched in tension. The force between pin member 201 and box member 202 is applied through pin load flank 254 and box load flank 255. Notably pin stab flank 257 and box stab flank 258 are not loaded during make-up. This results in contact pressure between load flanks 254 and 255 and gap 253 between stab flanks 257 and 258. As discussed above, a wedge thread (e.g., FIG. 1) forms a thread seal in part because of the interference between load flanks 225 and 226 and stab flanks 232 and 231. In wedge threads, this occurs near the end of the make-up of the connection because of the varying width of pin thread 106 and box thread 107. To have similar interference between load flanks 254 and 255 and stab flanks 257 and 258 on a cylindrical (i.e., non-tapered) free-running thread, the interference would exist substantially throughout the make-up of the connection because pin thread 206 and box thread 207 have a continuous width. Furthermore, root/crest interference, if any, would exist substantially throughout the make-up of the connection. This could lead to galling of the threads and difficulty in making-up the connection.

Figure 3A:
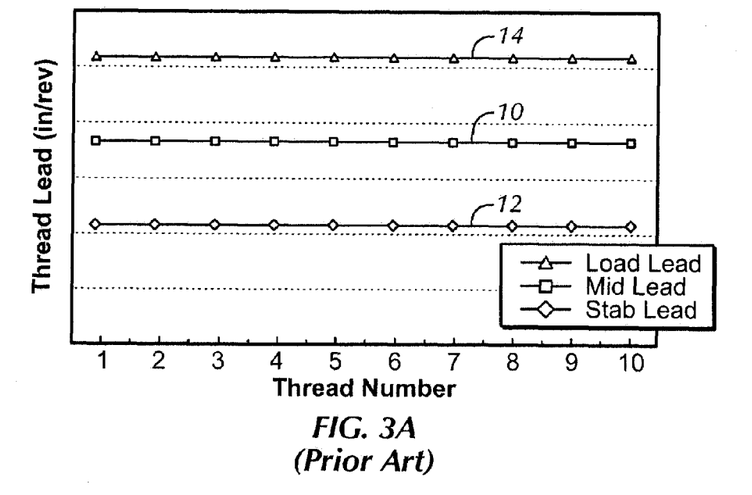

The variance in thread width for a wedge thread occurs as a result of the load flanks having different leads than the stab flanks. A thread lead may be quantified in inches per revolution or by the commonly used inverse term "thread pitch," (i.e., threads per inch). A graph of the leads for a prior art wedge thread is shown in FIG. 3A. For this connection, the load lead 14 is constant over the length of the connection and greater than the stab lead 12, which is also constant. The nominal lead is shown as item 10. As used herein, "nominal lead" refers to the average of load lead 14 and stab lead 12. The thread will widen with each revolution by the difference in load lead 14 and stab lead 12. As described above, the difference in the load lead 14 and the stab lead 12 is the "wedge ratio." For a free-running thread (i.e., non-wedge thread), load lead 14 and stab lead 12 would be substantially equal, thus causing the free-running thread to have a substantially constant thread width (i.e., a zero wedge ratio).

Figure 3B:
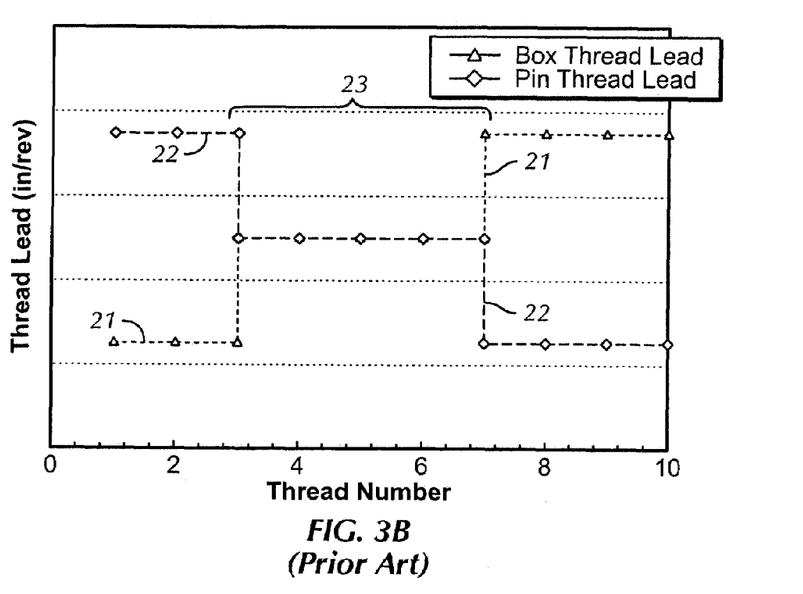

Intentional variances in thread leads have been disclosed in the prior art for the purposes of load distribution. One example of a varied thread lead for stress distribution is disclosed in U.S. Pat. No. 4,582,348 issued to Dearden, hereby incorporated by reference in its entirety. Dearden discloses a connection with free-running threads that has the pin thread and box thread divided into three sections, each with different leads (note that Dearden refers to thread pitch, which is quantified as threads per inch). In FIG. 3B, a graph of the thread leads for the box member and the pin member of Dearden is shown. As shown in the graph, at one end of the connection, a pin thread lead 21 is larger than the box thread lead 22. In the intermediate section 23, the pin thread lead 21 and box thread lead 22 are substantially equal. Then, at the other end of the connection, box thread lead 22 is larger than pin thread lead 21. In Dearden, the changes in pin thread lead 21 and box thread lead 22 are step changes (i.e., substantially instantaneous changes in the lead). The varied thread leads disclosed by Dearden are intended to distribute loading across a greater portion of the connection, and have no effect on the ability of the free-running threads to form a thread seal. Dearden does not disclose varying a load lead or stab lead independent of one another.

Another connection is disclosed in U.S. Pat. No. 6,976,711, issued to Sivley, assigned to the assignee of the present invention, and hereby incorporated by reference in its entirety. Sivley discloses connections having a variance in load lead and/or stab lead on one or both of the pin member and the box member. A graph of an embodiment disclosed by Sivley is shown in FIG. 3C. Sivley discloses varying load lead 14 relative to stab lead 12 at a selected rate over at least a portion of the pin thread and/or box thread. In FIG. 3C, the connection is a wedge thread as shown by the difference between load lead 14 and stab lead 12. Load lead 14 and stab lead 12 converge at a linear rate towards the end of the thread. Sivley discloses various other embodiments having load leads 14 and stab leads 12 that vary at linear rates relative to each other. The variance in the thread leads distributes the loads experienced by the connection over the length of the connection.

Figure 4:
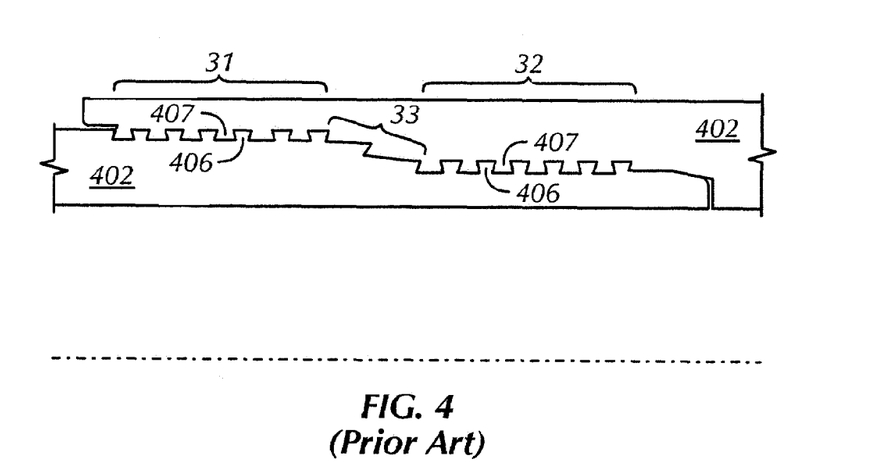
FIG. 4 is a cross-sectional view of a prior-art two-step tubular connection having free-running threads.

Referring now to FIG. 4, a prior art two-step connection is shown. The threads that form the connection are separated across multiple "steps," a large step, indicated by a bracket 31, and a small step, indicated by a bracket 32. The portion between large step 31 and small step 32 is commonly referred to as a mid-step 33. In some connections, mid-step 33 may be used as a metal-to-metal seal. Preferably, a pin thread crest (often referred to as a major diameter in a non-tapered threaded connection) on small step 32 of pin member 401, at its full design height, does not interfere with a box thread crest (often referred to as a minor diameter in a non-tapered threaded connection) on large step 31 of box member 402 when pin member 401 is stabbed into box member 402. The diameter of small step 32 of pin member 401 is smaller than the smallest crest-to-crest thread diameter on large step 31 of box member 402 so a pin thread 406 on small step 32 may be stabbed past a box thread 407 on large step 31. The threads on both small step 32 and large step 31, which have substantially the same nominal lead, engage with each revolution to make-up the connection. Thus, the number of revolutions during which the threads slide or rub against each other is reduced for the same number of engaged threads. A multi-step connection allows for each of the steps to have threads with different characteristics as long there is little or no variance in the nominal lead of the threads on the steps.

A two-step wedge thread connection is disclosed in U.S. Pat. No. 6,206,436, issued to Mallis, and hereby incorporated by reference herein. Mallis discloses a two-step wedge thread connection having different wedge ratios, one of which is considered to be an aggressive wedge ratio and the other a conservative wedge ratio, wherein "aggressive" refers to a larger wedge ratio, and "conservative" refers to a smaller wedge ratio. With all other thread characteristics held constant, a greater wedge ratio will exhibit a more determinate make-up. However, too large of a wedge ratio may have an inadequate wedging effect, which may allow the connection to back off during use. Conversely, smaller wedge ratios are better able to resist backing-off of the connection, but may have such an indeterminate make-up that galling may occur over the lengthened make-up distance. Mallis discloses that one of the steps in a multi-step thread may have a wedge ratio optimized for a more determinate make-up (aggressive), while another step may have a wedge ratio optimized to prevent backing-off of the connection (conservative).

U.S. Pat. Nos. 6,174,001 and 6,270,127 issued to Enderle, assigned to the assignee of the present invention, and incorporated by reference herein, disclose two-step, low torque wedge threads for tubular connections. In the references, one step is provided so that there is interference at make-up along at least one of the complementary stab flanks, load flanks, roots, and crests while clearance is provided along another step along at least one of the complementary stab flanks, load flanks, roots, and/or crests.

This configuration reduces the amount of torque required for make-up of the connection while retaining torque sensitivity, sealing capability, and threads necessary for structural purposes.

One problem with two-step connections is that the connection must be thick to reach 100 percent pipe body efficiency. As used herein, "pipe body efficiency" is the tensile strength of the connection relative to the tensile strength of the tubular. The primary reason for needing a thicker connection is the unengaged space of the mid-step, which is required so that the threads on the large step may clear the threads on the small step during stabbing. The mid-step, due to the lack of thread engagement, does not contribute to the overall strength of the connection. The advantages of having two separate threads often makes up for the decreased pipe body efficiency, however, it is desirable to have a single-step thread that may exhibit the advantages of two-step connections.

SUMMARY OF INVENTION

In one aspect, the present invention relates to a threaded connection including a pin member providing a single external wedge thread having a first external portion and a second external portion. Further, the threaded connection includes a box member providing a single internal wedge thread having a first internal portion and a second internal portion, wherein the first and second internal portions threadably correspond with the first and second external portions. Furthermore, the first internal and external portions are preferably characterized by a first wedge ratio and the second internal and external portions are preferably characterized by a second wedge ratio, wherein the first wedge ratio is less than the second wedge ratio and a radial metal-to-metal seal seals between the pin member and the box member and wherein the radial metal-to-metal seal comprises a seal angle between about 4 degrees and about 15 degrees.

In another aspect, the present invention relates to a threaded connection having a pin member providing a single external wedge thread comprising a first external portion and a second external portion. Further, the threaded connection has a box member providing a single internal wedge thread comprising a first internal portion and a second internal portion, wherein the first and second internal portions threadably correspond with the first and second external portions. Furthermore, the first internal and external portions are preferably characterized by a first wedge ratio and the second internal and external portions are preferably characterized by a second wedge ratio. Further still, a radial metal-to-metal seal seals between the pin member and the box member, and the pin and box members are configured such that, during make-up, the first external and internal portions reach a first specified make-up before engagement of the radial metal-to-metal seal and a second specified make-up of the second external and internal portions.

In another aspect, the present invention relates to a method to couple a threaded connection including engaging a pin end of the connection into a box end of the connection, wherein the pin end comprises an external wedge thread and the box end comprises an internal wedge thread. Further, the method includes rotating the connection to a first position to make-up a first portion of the pin end wedge thread with a first portion of the box end wedge thread at a first wedge ratio and rotating the connection to a second position to engage a radial metal-to-metal seal of the threaded connection. Further still, the method includes rotating the connection to a third position to make-up a second portion of the pin end wedge thread and a second portion of the box end wedge thread at a second wedge ratio.

In another aspect, the present invention relates to a threaded connection having wedge threads, the threaded connection includes a pin member comprising a pin thread having a pin thread crest, a pin thread root, a pin load flank, and a pin stab flank, wherein the pin thread comprises at least a first portion, a transition region, and a second portion formed sequentially thereon. Further, the threaded connection includes a box member comprising a box thread having a box thread crest, a box thread root, a box load flank, and a box stab flank, wherein the box thread comprises at least a first portion, a transition region, and a second portion formed sequentially thereon, the portions on the box thread corresponding generally in axial position with the portions on the pin thread.

Preferably, the first portion has a first wedge ratio, the transition region has a transition wedge ratio, and the second portion has a second wedge ratio, wherein thread leads are substantially constant within each of the portions. Furthermore, the threaded connection includes a radial metal-to-metal seal to seal between the pin member and the box member, wherein the pin and box members are configured such that during make-up, the first portions reach a first specified make-up before engagement of the radial metal-to-metal seal and a second specified make-up of the second portions.

BRIEF DESCRIPTION OF DRAWINGS

FIGS. 3A, 3B, and 3C show graphical representations of thread leads for various prior art tubular connections.

DETAILED DESCRIPTION

Some embodiments of the present invention include single-step wedge-threaded connections having variances in the wedge ratio so that a high-angle metal-to-metal seal may be used therewith. Furthermore, some embodiments are characterized by a multiple stage make-up of a wedge threaded connection, such that a first portion of the wedge thread may make-up at a conservative wedge ratio before a metal-to-metal seal engages and before a second portion of the wedge thread makes-up at an aggressive wedge ratio. Further still, in some embodiments, the metal-to-metal seal may engage simultaneously with the second portion make-up while, in other embodiments, the metal-to-metal seal may engage prior to the second portion make-up.

Figure 5A:
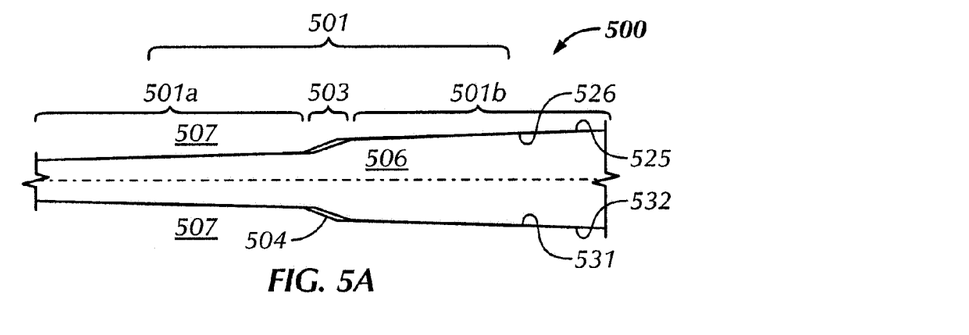
FIGS. 5A, 5B, and 5C schematically depict a three-portion wedge threaded connection.
Figure 5B:
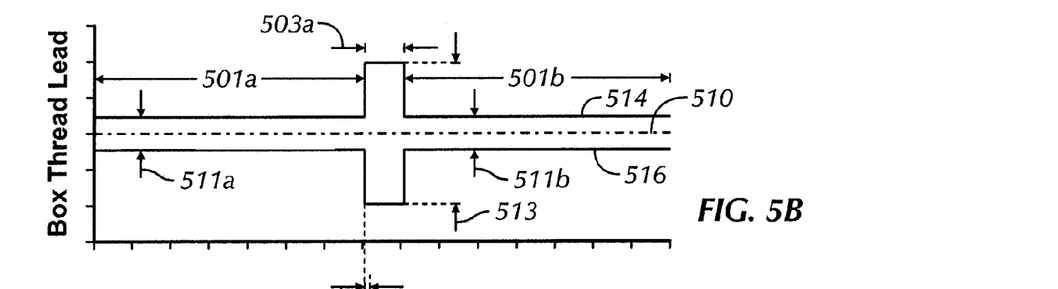
Figure 5C:
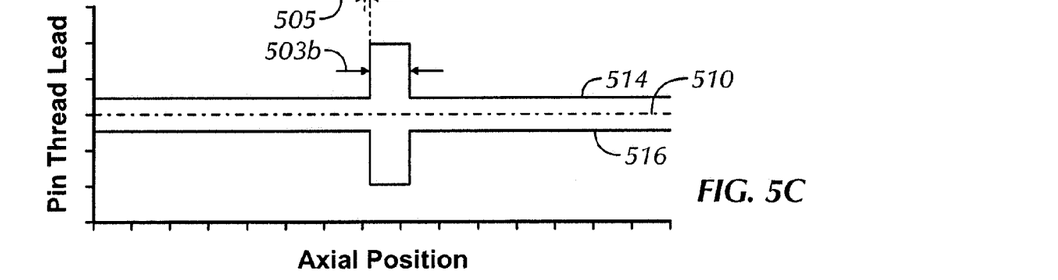

Referring now to FIGS. 5A-5C, a three-portion wedge-threaded connection 500 is shown. Particularly, FIG. 5A depicts connection 500 schematically as having a pin threaded member 506 and a box threaded member 507. Next, FIG. 5B is a graphical representation of the box thread lead of box member 507. Furthermore, FIG. 5C is a graphical representation of the pin thread lead of pin member 506. As such, FIGS. 5B and 5C depict their respective thread lead length (e.g., in inches) as a function of axial position (e.g., the thread number).

Nonetheless, for the sake of clarity, connection 500 is shown in FIG. 5A partially made-up, rather than at a selected final make-up. Referring to FIG. 5A, pin threaded member 506 corresponding to the graph of FIG. 5C is shown partially made-up with a box threaded member 507 corresponding to the graph shown in FIG. 5B. The partially made-up thread shown in FIG. 5A has three thread portions, 501A, 503, and 501B. Thread portion 503 is defined by the distal ends of box thread portion 503A and pin thread portion 503B, as shown in FIGS. 5B and 5C, when the box and pin are partially made-up.

Referring now to FIGS. 5B and 5C, the lengths of various thread leads as a function of axial position are depicted, wherein each unit of the axial position axis represents about a 360 degree turn of a thread pitch. For example, thread portions 501A and 501B are about seven thread pitches each, while another thread portion 503 is about one thread pitch. In FIG. 5A, pin thread 506 includes pin stab flanks 531 and pin load flanks 526 and box thread 507 includes box stab flanks 532 and box load flanks 525. Both pin and box threads are divided into three thread portions, 501A, 503A, and 501B. While wedge-thread connection 500 is shown as a three-portion connection, it should be understood that other configurations (e.g., two or greater than three portions) may be used to create wedge-threaded connections in accordance with embodiments of the present invention.

Referring still to FIGS. 5B and 5C, thread portions 501A have a wedge ratio 511A and thread portions 501B have a wedge ratio 511B, wherein wedge ratios 511A and 511B are substantially the same. Thread portion 503A of box member 507 and pin member 506 exhibit a wedge ratio 513 larger than wedge ratios 511A and 511B. As shown, box thread portion 503A and pin thread portion 503B are the same axial length, but as will be demonstrated later, thread portions 503A and 503B may be of different axial lengths. As thread portions 501A and 501B may have the same characteristics, together, they may be considered as a single, discontinuous thread 501, which is "interrupted" or "perturbed" by thread portions 503A and 503B.

Since a load lead 514 and a stab lead 516 are varied in a complementary manner on both pin member 506 and box member 507, a nominal lead 510 is substantially constant over the length of both pin member 506 and box member 507. At the end of first thread portion 501A, wedge ratio 511A increases to a second wedge ratio 513 by increasing a load lead 514 while proportionally decreasing a stab lead 516, so that nominal lead 510 is maintained substantially constant. As mentioned earlier, second wedge ratio 513 is larger than both wedge ratio 511A of thread portion 501A and wedge ratio 511B of thread portion 501B. Furthermore, in some embodiments, a helical length of made-up thread portion 503 may be in increments of about 360 degrees to prevent eccentric loading of connection 500. After portion 503, wedge ratio 513 decreases to wedge ratio 511B characteristic of thread portion 501B, which, as shown in FIGS. 5A-5C, is substantially equal to wedge ratio 511A of thread portion 501A.

At the partially made-up condition shown in FIG. 5A, there may be contact between the pin stab flank 531 and box stab flank 532, and between pin load flank 526 and box load flank 525 in both thread portion 500A and thread portion 501B, but clearance 504 between the stab and load flanks in made-up thread portion 503.

Additionally, FIGS. 5B-5C disclose an offset 505 between the start of thread portion 503B on pin thread 506 (FIG. 5C) and the start of thread segment 503A on box thread 507 (FIG. 5B). As shown, thread portion 503A begins at a slightly earlier selected axial position on box member 507 than thread portion 503B on pin member 506. This offset allows the threads of box member 507 to "open up" or widen slightly earlier than pin thread 506, resulting in a clearance between flanks in thread portion 503 when the connection is partially made-up as shown in FIG. 5A. To return to flank contact (or interference), thread portion 501B may begin at an earlier axial position on box member 507, thus allowing threads of pin member 506 to "catch up." Thus, the size of offset 505 may dictate the relative flank contact in thread segments 501A, 503, and 501B. For example, assuming connection 500 shown in FIGS. 5A-5C (wherein, at a selected partial make-up, the thread flanks in thread portions 501A and 501B are in contact and the thread flanks in thread portion 503 are in clearance), increasing offset 505 without changing any other thread characteristics would increase the flank clearance in thread portion 503 and reduce or eliminate the flank contact in thread portion 501B.

Similarly, relative flank contact in thread segments 501A, 503, and 501B at a selected make-up may be changed by altering the relative axial lengths of box thread portion 503A and pin thread portion 503B. For example, assuming connection 500 shown in FIGS. 5A-5C, increasing the axial length of pin thread portion 503B in FIG. 5C would result in increased contact stress in thread portion 501B, reduced contact stress in thread portion 501A, and an increased clearance at thread portion 503. Therefore, connection 500 would tend to make-up first on the flanks of thread portion 501B.

By varying the size of offset 505 and the relative widths of thread portions 503A and 503B on the box and pin threads respectively, a thread designer may tailor the relationship between the flanks in all three thread portions 501A, 503, and 501B at a selected final make-up. For example, in one embodiment, the thread flanks in at least one of the three thread portions 501A, 503, and 501B may be in clearance at a selected make-up. Similarly, in other embodiments the flank interference in thread portion 503 at a selected final make-up may be less than, equal to, or greater than the flank interference in thread portions 501A or 501B. In another embodiment, there may be flank interferences in all thread portions 501A, 503, and 501B at a selected make-up which are all different from one another. In such an embodiment, flank contact may occur on one thread portion of the wedge thread before another thread portion at a preliminary make-up, but with both portions having flank interference at a selected make-up. Further, one or more thread portions may have interference between only the load flanks or the stab flanks instead of both.

Because wedge ratios 511A and 511B are conservative relative to wedge ratio 513 of portion 503, contact stress between mating flanks in thread portions 501A and 501B will rise slowly with increased make-up, while the flank contact stresses in portion 503 will rise more quickly. In the embodiment represented by FIGS. 5A-5C, at a partial make-up, the flanks of thread portions 501A and 501B may be in contact while the flanks of thread portion 503 may be in clearance. Subsequently, at a selected final make-up, the flank interference may be the same in all three thread portions 501A, 503, and 501B.

In another embodiment, at a selected final make-up the flank interference in thread portions 501A and 503 may be the same while the flank interference in thread portion 501B may be lower. This embodiment may be useful, for example, in high-torque applications where thread portion 501B, having a lower flank interference at a selected final make-up, may act as a "back-up" torque shoulder.

Figure 6A:
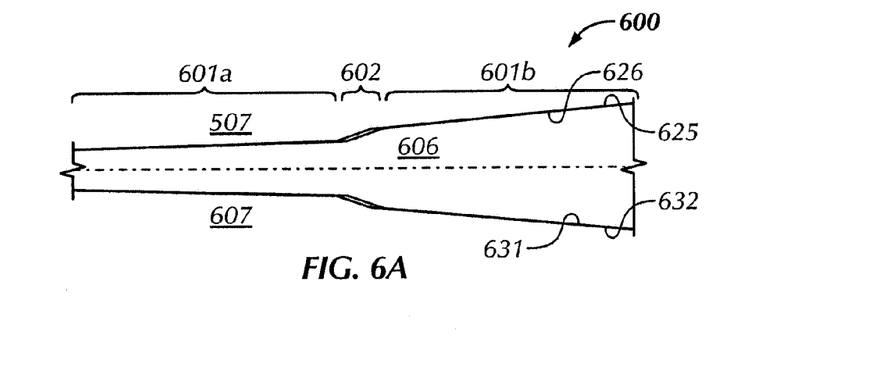
FIGS. 6A, 6B, and 6C schematically depict a three-portion wedge threaded connection.
Figure 6B:
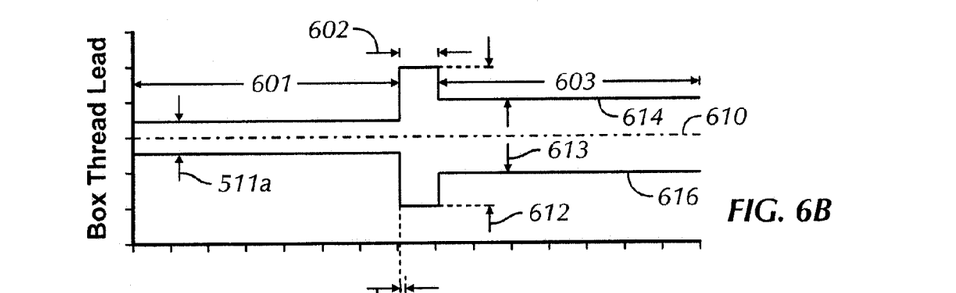
Figure 6C:
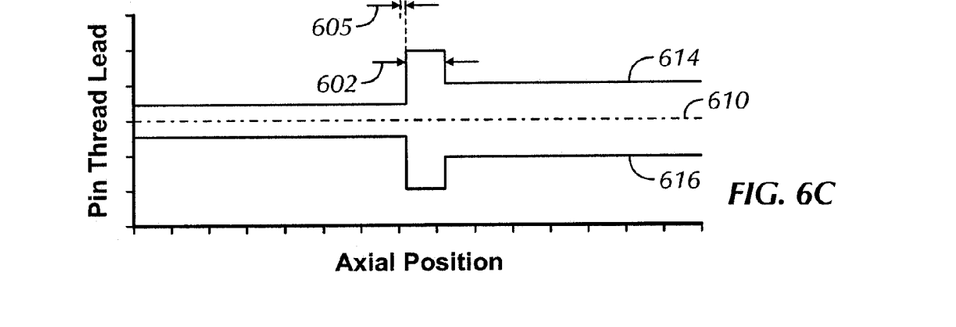

Referring now to FIGS. 6A-6C, a three-portion wedge-threaded connection 600 is shown. In FIG. 6A, a pin member 606 corresponding to the graph of FIG. 6C is shown at a selected final make-up with a box member 607 corresponding to the graph of FIG. 6B. In this embodiment, threads of pin member 606 and box member 607 exhibit interference between load flanks 625 and 626 and stab flanks 631 and 632 on a first portion 601 and a second portion 603, on both a first portion 601 (analogous to the small step 32 of FIG. 4) and a second portion 603 (analogous to the large step 31 of FIG. 4) of the wedge-threaded connection 600 at selected make-up. Furthermore, a transition region 602 between first portion 601 and second portion 603 is shown. Thus, FIGS. 6A-6C represent a first portion 601 of approximately seven thread pitches, a transition region 602 of approximately one pitch, and a second portion 603 of approximately seven pitches.

In contrast, two-step connections having differential wedge ratios are disclosed in U.S. Pat. No. 6,206,436 issued to Mallis, discussed above. Mallis' teachings (including all of the advantages), as they apply to two-step connections having two different wedge ratios, are generally applicable to the multiple thread-portion single step connections disclosed herein. Using terminology from Mallis, in the embodiment shown in FIGS. 6A-6C, second portion 603 exhibits an "aggressive" wedge ratio 613, while first portion 601 exhibits a "conservative" wedge ratio 611. However, unlike the disclosure of Mallis and FIGS. 5A-C discussed above, FIGS. 6A-6C depict continuous, single-step threads without interruptions between portions.

While transition region 602 is shown having clearance between load flanks 625, 626 and stab flanks 631, 632, it should be understood by one of ordinary skill that transition region 602 may have load flank 625, 626 or stab flank 631, 621 interference. Furthermore, while transition region 602 is shown as extending over only one thread pitch, it should be understood that a larger or smaller transition region 602 may be used. Additionally, in one embodiment, flank interference may occur on one portion of the wedge thread before the other at make-up, with both first portion 601 and second portion 603 having interference at selected make-up. Further, one or more of thread portions 601, 602, and 603 may have interference between only the load flanks or the stab flanks instead of both.

To achieve the three-portion configuration shown in FIG. 6A, a load lead 614 and a stab lead 616 may be varied in a complementary manner on both pin member 606 and box member 607 as shown in FIGS. 6B and 6C. As depicted, the nominal lead 610 is held substantially constant over the length threads on both pin member 606 and box member 607. Along first portion 601, the difference between load lead 614 and stab lead 616 (i.e., the wedge ratio 611) is substantially constant. At the end of first portion 601, wedge ratio 611 increases to a transition wedge ratio 612 by increasing load lead 614 a selected amount while proportionally decreasing stab lead 616, substantially maintaining nominal lead 610. As may be seen, transition wedge ratio 612 is larger than both wedge ratio 611 of first portion 601 and wedge ratio 613 of second portion 603. The length of the threads at transition region 602 allows transition between first portion 601 and second portion 603, and is relatively small in helical length compared to first portion 601 and second portion 603. In some embodiments, the helical length of transition region 602 may be in increments of about 360 degrees to prevent eccentric loading of the connection. Following transition region 602, transition wedge ratio 612 decreases to wedge ratio 613 characteristic of second portion 603, which, in FIGS. 6A-6C, is shown greater than wedge ratio 611 of first portion 601.

Additionally, FIGS. 6A-6C also disclose an offset 605 in transition thread portion 602 of pin member 606 and box member 607. As shown, transition thread portion 602 begins at a slightly earlier selected axial position on box member 607 than on pin member 606. This offset allows the threads of box member 607 to "open up" or widen slightly earlier than those of pin member 606, resulting in a selected clearance between flanks on the transition region 602. To return to flank interference, second portion 603 may begin at an earlier selected axial position on box member 607, thus allowing threads of pin member 606 to "catch up." Alternatively, second portion 603 of box member 607 and pin member 606 may begin simultaneously to further delay a selected make-up of second portion 603 following a selected make-up of first portion 601.

Thus, variations in load lead 614 and stab lead 616 over the length of the threads allows for a connection to exhibit different make-up characteristics in each portion of the connection. Those having ordinary skill in the art will appreciate that various combinations of portions (e.g., 601, 602, 603) may be used in accordance with embodiments of the present invention.

Figure 7A:
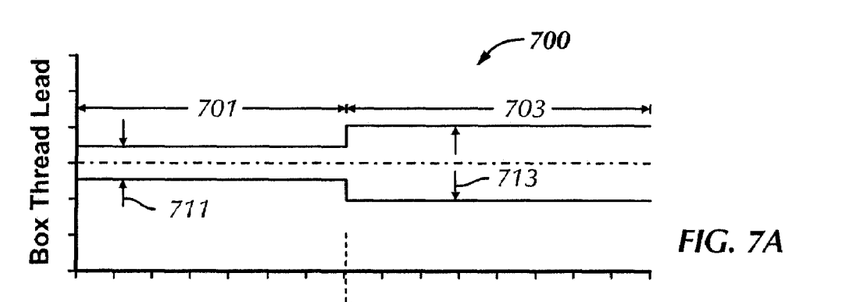
FIGS. 7A and 7B schematically depict a two-portion wedge threaded connection.
Figure 7B:
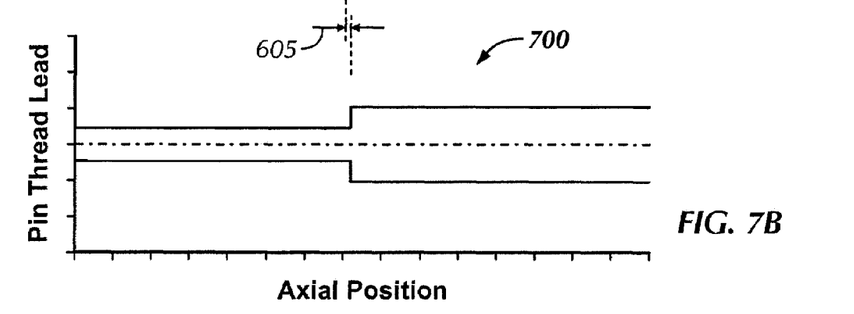

Referring now to FIGS. 7A-7B, a two-portion wedge-threaded connection 700 is shown schematically. Connection 700 is distinct from connection 600 of FIGS. 6A-6B in that connection 700 does not include a transition thread portion (e.g., 602) between a first portion 701 and a second portion 703. As such, connection 700 is characterized by a wedge ratio 711 of first portion 701 that instantaneously expands to a larger wedge ratio 713 of second portion 703. Similar to the connections shown in FIGS. 5 and 6, the second portion of the pin thread may lag the box thread lead by an offset 705 to allow the box thread to open up or widen slightly earlier than pin thread. While change in wedge ratio from 711 to 713 is shown as a substantially instantaneous step change, a smoother graduated change may be used.

As described above, wedge threads are characterized by indeterminate make-up. However, the amount of indeterminateness of a wedge-threaded connection may be varied by changing the underlying wedge ratio. For example, wedge-threaded connections having a more conservative (i.e., lower) wedge ratio, make-up to a selected amount of flank interference more indeterminately than those having more aggressive wedge ratios. As such, a connection having a more conservative wedge ratio will require more rotation (and torque) to reach a selected make-up, and thus be more indeterminate than a connection having an aggressive wedge ratio. In contrast, connections exhibiting more aggressive wedge ratios will make-up more determinately, but will be less resistant to backing off than connections having conservative wedge ratios.

As such, single-step wedge-threaded connections with at least two threaded portions at differing wedge ratios are highly beneficial in connections having a metal-to-metal seal (e.g., 103 and 104 of FIG. 1A) to reduce the amount of wear and galling experienced by such seals. Particularly, a continuous, wedge-threaded connection, in which a first thread portion has a conservative wedge thread, and a second thread portion has an aggressive wedge thread, may be used to allow a more determinate engagement of such a seal.

Figure 8:
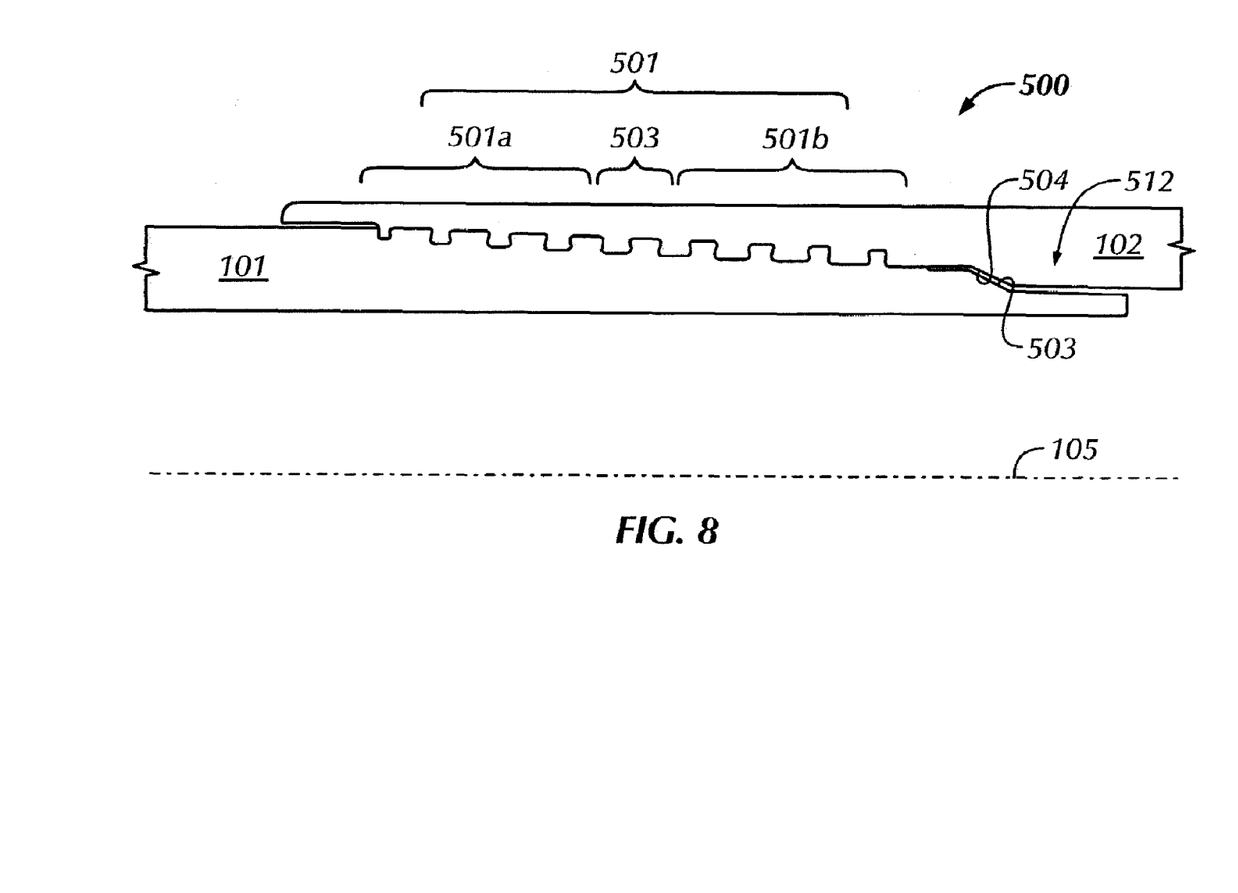
FIG. 8 shows a cross-sectional view of a tubular connection having wedge threads and a high-angle metal seal in accordance with embodiments of the present disclosure.

For example, in an embodiment in accordance with the present invention, a continuous, single-step wedge-threaded connection may be constructed having two (or more) portions, a first portion having a conventional (less aggressive) wedge ratio, and a second portion having a higher (more aggressive) wedge ratio. Because of the high wedge ratio of the second portion, the connection could include a radial metal-to-metal seal having a seal angle between about 4 and about 15 degrees. Further, in some embodiments, seal angles of about 7 degrees, about 14 degrees, or anywhere therebetween may be used. As described above, the metal-to-metal seal may be a pin-nose seal, box face seal, or any other seal known to one of ordinary skill in the art. FIG. 8 shows a continuous, single-step wedge threaded connection 500 having a pin member 101 and a box member 102. The connection 500 is centered about centerline 105. The connection 500 includes a first portion having a less aggressive wedge ratio 501a, a transition region 503, and a second portion having a more aggressive wedge ratio 501b. The connection 500 also includes a high-angle metal seal 512 that includes a pin seal surface 503 and a box seal surface 504.

Furthermore, for a two-portion wedge-threaded connection, the more aggressive second portion may comprise a smaller percentage of the total number of thread pitches than the more conservative first portion. For example, if a conventional standard wedge thread has ten pitches and a wedge ratio of 0.015"/pitch (i.e., the thread width grows by 10 pitches·0.015"/pitch=0.150" over the length of the thread), a two-portion wedge thread of the same axial length may have two pitches at a wedge ratio of 0.030 in the second portion and the remaining eight pitches at 0.01125"/pitch wedge ratio (i.e., [0.150"−2·0.030"]/8) in the first portion and still maintain the same growth in thread width over the length of the thread. Alternatively, the first and second portions may be of substantially equal number of pitches or length. Alternatively still, a multi-portion wedge-threaded connection may have several alternating conservative and aggressive portions, wherein each conservative/aggressive couple acts to selectively make-up the connection in parallel.

The make-up sequence for a continuous two-portion wedge-threaded connection in accordance with embodiments of the present invention may include the first portion making-up (e.g., a preliminary rotation) before the engagement of the metal-to-metal seal (e g, a secondary rotation) and the making-up of the second portion (e.g., a tertiary rotation). Preferably, the wedge ratio of the second portion could be related to the angle of the metal-to-metal seal, such that the second portion reaches its selected make-up at the same time the metal-to-metal seal becomes fully engaged. Generally, to achieve this goal, a steeper seal angle will require a higher wedge ratio in the second thread portion. For example, as the metal-to-metal seal having a seal angle of about 14 degrees will fully engage within ¼ turn of a typical wedge thread, the axial position and wedge ratio of the second portion may be chosen such that the second portion reaches desired flank interference in about ¼ turn, at essentially the same selected make-up that the metal-to-metal seal reaches full engagement.

It should be understood that wedge thread connections in accordance with embodiments of the present invention are advantageous over those in the prior art in that the metal-to-metal seals contained therewith may be more durable and less susceptible to damage in service and during make-up and break-out cycles.

High-angle metal-to-metal seals in accordance with embodiments of the present invention are less susceptible to damage from eccentric contact during make-up and break-out as they are engaged after a first portion of a continuous multi-portioned wedge-threaded connection is made up. As such, make-up of the first portion prior to the engagement of the metal-to-metal seals may act to "pilot" the seal components into engagement with reduced likelihood of eccentric contact. Similarly, during break out, the seals may be disengaged prior to break-out of the first portion, thus again allowing the first portion to "pilot" the seal components apart axially, thus protecting seal surfaces from eccentric contact. Thus early engagement/late disengagement of the first portion of a continuous multi-portioned wedge-threaded connection may protect seal surfaces by piloting components of a metal-to-metal seal into and out of engagement along the axis of the connection.

Furthermore, as described above, the reduced contact area of a high-angle seal in accordance with embodiments of the present invention translates to less metal-to-metal seal area, thereby reducing the likelihood and magnitude of galling therebetween. Furthermore, as the high-angle seals engage under less rotational displacement than low-angle seals, there is less metal-to-metal frictional displacement through that seal area.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A threaded connection, comprising:
   a pin member providing a single external wedge thread comprising a first external portion and a second external portion;
   a box member providing a single internal wedge thread comprising a first internal portion and a second internal portion, wherein the first and second internal portions threadably correspond with the first and second external portions;
   wherein the first internal and external portions are characterized by a first wedge ratio and the second internal and external portions are characterized by a second wedge ratio, wherein the first wedge ratio is less than the second wedge ratio;
   a radial metal-to-metal seal configured to seal between the pin member and the box member; and
   wherein the radial metal-to-metal seal comprises a seal angle between about 4 degrees and about 15 degrees.

2. The threaded connection of claim 1, wherein the pin and box members are configured such that, during make-up, the first external and internal portions reach a first selected make-up before engagement of the radial metal-to-metal seal and a second selected make-up of the second external and internal portions.

3. The threaded connection of claim 1, wherein the radial metal-to-metal seal is selected from the group consisting of pin-nose seals, box-face seals, and mid-thread seals.

4. The threaded connection of claim 1, wherein the radial metal-to-metal seal comprises a seal angle between about 7 degrees and about 14 degrees.

5. The threaded connection of claim 1, further comprising a transition region between the first internal and external portions and the second internal and external portions.

6. The threaded connection of claim 1, further comprising an offset between the second internal portion and the second external portion.

7. The threaded connection of claim 1, further comprising a third portion on each of the box member and the pin member, wherein the third portions are characterized by a third wedge ratio substantially equal to the first wedge ratio.

8. A threaded connection, comprising:
   a pin member providing a single external wedge thread comprising a first external portion and a second external portion;
   a box member providing a single internal wedge thread comprising a first internal portion and a second internal portion, wherein the first and second internal portions threadably correspond with the first and second external portions;
   wherein the first internal and external portions are characterized by a first wedge ratio and the second internal and external portions are characterized by a second wedge ratio; and
   a radial metal-to-metal seal configured to seal between the pin member and the box member;

wherein the pin and box members are configured such that, during make-up, the first external and internal portions reach a first selected make-up before engagement of the radial metal-to-metal seal and a second selected make-up of the second external and internal portions.

9. The threaded connection of claim 8, wherein the radial metal-to-metal seal is selected from the group consisting of pin-nose seals, box-shoulder seals, and mid-shoulder seals.

10. The threaded connection of claim 8, wherein the radial metal-to-metal seal comprises a seal angle between about 4 degrees and about 15 degrees.

11. The threaded connection of claim 8, wherein the first wedge ratio is less than the second wedge ratio.

12. The threaded connection of claim 8, further comprising a transition region between the first internal and external portions and the second internal and external portions.

13. The threaded connection of claim 8, further comprising an offset between the second internal portion and the second external portion.

14. The threaded connection of claim 13, wherein the first wedge ratio and the second wedge ratio are substantially equal.

15. The threaded connection of claim 8, wherein the radial metal-to-metal seal engages before the second selected make-up of the second internal and external portions.

16. The threaded connection of claim 8, wherein the radial metal-to-metal seal engages simultaneously with the second selected make-up of the second external and internal portions.

17. The threaded connection of claim 8, wherein the first specified make-up occurs when load and stab flanks of the first internal and external portions reach a specified amount of interference.

18. The threaded connection of claim 8, wherein the second specified make-up occurs when load and stab flanks of the second internal and external portions reach a specified amount of interference.

19. A threaded connection having wedge threads, the threaded connection comprising:
- a pin member comprising a continuous pin thread having a pin thread crest, a pin thread root, a pin load flank, and a pin stab flank, wherein the pin thread comprises at least a first portion, a transition region, and a second portion formed sequentially thereon;
- a box member comprising a continuous box thread having a box thread crest, a box thread root, a box load flank, and a box stab flank, wherein the box thread comprises at least a first portion, a transition region, and a second portion formed sequentially thereon, the portions on the box thread corresponding generally in axial position with the portions on the pin thread;
- wherein the first portion has a first wedge ratio, the transition region has a transition wedge ratio, and the second portion has a second wedge ratio;
- wherein thread leads are substantially constant within each of the portions;
- a radial metal-to-metal seal configured to seal between the pin member and the box member; and
- wherein the pin and box members are configured such that during make-up, the first portions reach a first selected make-up before engagement of the radial metal-to-metal seal and a second selected make-up of the second portions.

* * * * *